United States Patent [19]

Kobayashi et al.

[11] Patent Number: 4,525,497
[45] Date of Patent: Jun. 25, 1985

[54] PROCESS FOR PRODUCING EPOXY-TYPE-LACQUER

[75] Inventors: Seishichi Kobayashi; Tetsuo Miyazawa, both of Yokohama; Hiroshi Ueno, Yokosuka, all of Japan

[73] Assignee: Toyo Seikan Kaisha, Ltd., Tokyo, Japan

[21] Appl. No.: 574,081

[22] Filed: Jan. 26, 1984

[30] Foreign Application Priority Data

Jan. 26, 1983 [JP] Japan .................... 58-9965

[51] Int. Cl.$^3$ .................... C09D 3/52; C09D 3/58; C09D 3/66; C09D 3/76
[52] U.S. Cl. .................... 523/400; 523/100; 523/427; 528/89; 528/104
[58] Field of Search .................... 523/400, 427, 100; 528/89, 104

[56] References Cited

U.S. PATENT DOCUMENTS 3,931,109  1/1976  Martin .................... 528/104
4,151,305  4/1979  Davis et al. .................... 528/104
4,358,578  11/1982  Brownscombe .................... 528/104

*Primary Examiner*—Ronald W. Griffin
*Attorney, Agent, or Firm*—Sherman & Shalloway

[57] ABSTRACT

A process for producing an epoxy-type lacquer, which comprises reacting a liquid epoxy resin having about one bisphenol A skeleton on an average in the molecular chain and derived from bisphenol A and an epihalohydrin, with bisphenol A in the presence of a catalyst in an inert organic solvent to prepare a concentrated solution of an epoxy resin having a number average molecular weight of from 2,000 to 10,000, adding an organic solvent to the concentrated solution to dilute it and maintain it at a temperature lower than that at which the catalyst is active, and mixing the resulting diluted solution with a solution of a resin acting as a curing agent for the epoxy resin. The resulting lacquer is especially useful for coating metallic containers.

9 Claims, No Drawings

PROCESS FOR PRODUCING EPOXY-TYPE-LACQUER

BACKGROUND OF THE INVENTION

1. Field of the Invention

This invention relates to a process for producing a solution of an epoxy resin as a lacquer, and more specifically, to a process by which a lacquer containing an epoxy resin component having a uniform molecular weight and being in the form of a solution directly usuable as a lacquer is produced at a high production speed and in a high yield.

2. Description of the Prior Art

Epoxy resins for paints, particularly lacquers for coating metals such as metallic containers, are desired to have a relatively high molecular weight of about 2,000 to about 10,000 in order to increase the processability or the curing speed of coated films.

Conventional methods of producing such epoxy resins for lacquers fall roughly within two groups: a one-step process and a two-step process.

The one-step process involves directly reacting bisphenol A [2,2-bis(4-hydroxyphenyl)propane] and an epihalohydrin in the presence of an acid binder. The resulting epoxy resin, however, should be subjected to a troublesome purifying operation such as washing, and its molecular weight is generally low.

The two-step process comprises first preparing a liquid epoxy resin having about one bisphenol A skeleton on an average in the molecular chain from bisphenol A and an epihalohydrin, and then reacting the liquid epoxy resin with bisphenol A in the presence of a catalyst under molten conditions to produce an epoxy resin having a high molecular weight. Since this melt polyaddition process gives the final epoxy resin in the form of a solid mass, its solution for a lacquer must be prepared by subjecting it to a troublesome dissolving operation which requires high temperatures of about 80° to 100° C. and long periods of several hours. Furthermore, the resulting epoxy resin is very highly viscous in the molten state and remains adhering to the reactor wall. Only about 80% of it can be recovered (that portion adhering to the reactor wall is removed by washing with a solvent), and its yield is not satisfactory. Moreover, in the second melt polyaddition step, the reaction inevitably proceeds heterogeneously, and it is impossible to avoid inclusion in the final epoxy resin of a certain proportion of an epoxy resin component having a relatively low molecular weight of about several hundred or a gelled component whose molecular chain structure is crosslinked. This is undesirable in view of the various properties of the resin used as a lacquer, such as extraction resistance, processability and corrosion resistance.

To remove these defects, it may be possible to react a liquid epoxy resin and bisphenol A in an organic solvent thereby directly producing an epoxy resin as a solution which is easy to handle. However, when the solids concentration of the solution is adjusted to a value which makes the solution easy to handle in respect of its viscosity, the polyaddition reaction between the liquid epoxy resin and bisphenol A takes place at a markedly slow rate, and the production speed is not satisfactory. Furthermore, the molecular weight of the final epoxy resin tends to become relatively broad.

SUMMARY OF THE INVENTION

It is an object of this invention therefore to provide a process by which a lacquer containing an epoxy resin component having a uniform molecular weight and being in the form of a solution directly usable as a lacquer is produced at a high production speed and in a high yield.

Another object of this invention is to provide a process for producing an epoxy-type lacquer efficiently without a troublesome operation of dissolving the resulting epoxy resin.

According to this invention, there is provided a process for producing an epoxy-type lacquer, which comprises reacting a liquid epoxy resin having about one bisphenol A skeleton on an average in the molecular chain and derived from bisphenol A and an epihalohydrin with bisphenol A in the presence of a catalyst in an inert organic solvent to prepare a concentrated solution of an epoxy resin having a number average molecular weight of from 2,000 to 10,000, adding an organic solvent to the concentrated solution to dilute it and maintain it at a temperature lower than that at which said catalyst is active, and mixing the resulting diluted solution with a solution of a resin acting as a curing agent for the epoxy resin.

DETAILED DESCRIPTION OF THE INVENTION

The present invention is based on the new finding that there is a considerable difference between the amount of an organic solvent (the resin solids concentration) suitable for the polyaddition reaction between the liquid epoxy resin and bisphenol A and the amount of the organic solvent (the resin solids concentration) desirable for handling of an epoxy resin solution; that in the case of the former, by providing a solution having a relatively high solids concentration of, for example, 70 to 95%, an epoxy resin having a uniform molecular weight can be produced in the form of a concentrated solution while maintaining the rate of the polyaddition reaction at a relatively high level, and the non-uniformity of the reaction can be removed; and that the concentrated solution of the epoxy resin can be easily converted to a dilute solution of the epoxy resin having a solids concentration of, for example, 15 to 60% by weight by simply adding an additional amount of an organic solvent to it, and it can be easily taken out from the reactor in a high yield.

As stated above, it is important in this invention to carry out the polyaddition reaction of the liquid epoxy resin and bisphenol A in a limited amount of an organic solvent in the presence of a catalyst. The amount of the organic solvent is 70 to 95% by weight, particularly 75 to 90% by weight, in terms of the resin solids concentration. If this solids concentration is lower than the above-specified limit, the speed of producing the final epoxy resin becomes exceedingly low. In the polyaddition reaction to which the invention pertains, the rate of the reaction in the early stage of the reaction is proportional to the product of the concentrations of the individual components. Furthermore, since the polyaddition reaction is a consecutive reaction, concentration dependence in actual practice will be greater. It will be understood from this therefore that in the present invention, the reaction must be carried out while the solids concentration of the organic solvent solution is considerably high unlike the case of a solution in the ordinary sense. When the solids concentration is higher than the specified limit, the reaction tends to be difficult to control as in the case of a melting method, and moreover, an epoxy resin component having a low molecular weight or a gelled material tends to be included in the final epoxy resin.

The present inventors have ascertained that although the amount of the organic solvent present is very small as can be seen from the resin solids concentrations in the aforesaid range, the viscosity of the reaction system is held at a considerably lower level than that of a melt reaction system, and the polyaddition reaction of the liquid epoxy resin and bisphenol A proceeds in a homogeneous state.

In the present invention, the solvent used in the polyaddition reaction should completely dissolve not only the starting liquid epoxy resin and bisphenol A but also the resulting epoxy resin when used in a relatively small amount. Since the reaction is desirably carried out at high temperatures, the solvent desirably has a relatively high boiling point.

From this viewpoint, it is especially desirable in this invention to use inert organic solvents having a solubility parameter ($S_p$ value) of 8.0 to 12.0, especially 8.5 to 11.5 and a boiling point of at least 130° C., particularly at least 140° C. The $S_p$ value, as used herein, is defined by the following equation as described at 252 of "Yozai Handbook" (Solvent Handbook) published in 1963 by Sangyo Tosho Kabushiki Kaisha, Japan.

$$(S_p)^2 = (C.E.D)$$
$$= \frac{\Delta E}{V} = \frac{\Delta H - RT}{V} = \frac{C}{M}(\Delta H - RT)$$

wherein
C.E.D.: cohesive energy density (cal/cc),
$\Delta E$: evaporation energy (cal/mol),
V: molecular volume (cc/mol),
$\Delta H$: latent heat of evaporation,
R: gas constant (cal/mol),
C: density (g/cc),
M: gram-molecular weight (g/mol),
T: absolute temperature (K).

Solvents which have a polar group such as a hydroxyl group, an ether group, an amide group, an ester group, a carboxyl group or a halogen atom and a large degree of hydrogen bonding show large $S_p$ values. In the present invention, single solvents or mixtures of solvents which as a whole have an $S_p$ value within the above range can be used.

The $S_p$ value of a mixed solvent can be obtained, for example, as an arithmetic mean defined by the following equation.

$$\overline{S_p} = \sum_{x=1}^{n} S_{px} \cdot M_x \qquad (1)$$

wherein $S_{px}$ is the $S_p$ of a certain component of the mixed solvent, $M_x$ is the molar fraction of this solvent component, and n is the number of the components of the solvent.

If the $S_p$ value is either higher or lower than the above specified limits, the solubilizing power of the solvents or the uniformity of the reaction tends to be reduced.

In the present specification, the term "inert organic solvent" means that the solvent is substantially irrelevant to the polyaddition reaction. For example, those organic solvents which have substantial reactivity with the oxirane ring but do not participate in the reaction under the reaction conditions used can be used in this invention so long as they satisfy the aforesaid requirements.

Some non-limitative examples of organic solvents meeting these requirements are shown below.

Cellosolve-type solvents represented by the general formula $$R_1-O-CH_2CH_2-O-R_2 \qquad (2)$$

wherein $R_1$ represents an alkyl group having up to 8 carbon atoms, and $R_2$ represents a hydrogen atom or an acyl group;
such as methyl Cellosolve, ethyl Cellosolve, butyl Cellosolve, hexyl Cellosolve and ethyl Cellosolve acetate.

Carbitol-type solvents represented by the general formula $$R_3-O-CH_2CH_2-O-CH_2CH_2-O-R_4$$

wherein each of $R_3$ and $R_4$ represents an alkyl group having 1 to 8 carbon atoms;
such as diethylene glycol diethyl ether and diethylene glycol dibutyl ether.

Higher-boiling alcohol-type solvents such as amyl alcohol, hexyl alcohol and cyclohexyl alcohol.

High boiling ketone-type solvents such as cyclohexanone, methyl amyl ketone, butyl hexyl ketone, diacetone alcohol and isophorone.

These solvents may be used singly or in combination. Furthermore, these solvents may be used in combination with high-boiling aromatic solvents such as xylene, Solvesso (a tradename for a product of Esso Standard Co.), and Shellsol (a tradename for a product of Shell Chemical Co.).

The liquid epoxy resin used in this invention is composed mainly of bisepoxide of the following formula

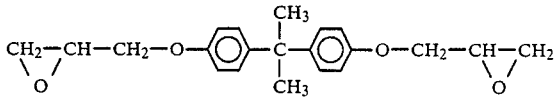

and generally has a number average molecular weight of 320 to 400 and an epoxy equivalent of 170 to 220.

The liquid epoxy resin and bisphenol A are reacted in stoichiometrical amounts which provide the molecular weight of the final epoxy resin, generally in a mol ratio of from 1:0.75 to 1:0.95.

The catalyst may be any of those catalysts which have heretofore been used in polyaddition reactions of this type. Examples include compounds of alkali metals or alkaline earth metals, for example the hydroxides, carbonates and bicarbonates of alkali metals or alkaline earth metals such as sodium hydroxide, potassium hydroxide, lithium hydroxide, barium hydroxide, calcium hydroxide, sodium carbonate, sodium bicarbonate and sodium calcium; salts such as sodium chloride, lithium chloride, calcium chloride, sodium acetate and sodium phosphate; and amines such as n-butylamine, tri-n-butylamine, triethanolamine, piperidine and morpholine. The catalyst is used in a general catalytic amount, for example 0.001 to 1.0% by weight based on the reaction system.

A reactor is charged with the liquid epoxy resin, bisphenol A, the solvent and the catalyst, and the polyaddition reaction is carried out at a temperature of generally 120° to 230° C., especially 130° to 210° C. The reaction may be carried out in a closed system such as in an autoclave. In view of the reaction operation, the reaction is desirably carried out under reflux at atmospheric pressure. The reaction may be carried out in air, but sometimes desirably in an inert atmosphere such as a nitrogen stream.

The polyaddition reaction time varies depending upon the molecular weight of the desired epoxy resin, the reaction temperature and the amount of the solvent.

Generally, the reaction is completed within a relatively short period of from about 1to about 12 hours. This is one advantage of this invention.

Thus, according to this invention, a high-molecular-weight epoxy resin having a number average molecular weight of 2,000 to 10,000 and preferably an epoxy equivalent in the range of 1,000 to 8,000 is obtained in the form of a concentrated solution. An inert organic solvent is added to the resulting concentrated solution of the epoxy resin so that the resin solids concentration of the resulting solution becomes 15 to 60% by weight, especially 20 to 55% by weight, and its temperature becomes lower than the temperature at which the aforesaid catalyst is active. The mixing of the organic solvent is effected in the polyaddition reaction system immediately after the completion of the reaction. Another advantage of the invention is that since the epoxy resin after completion of the reaction contains a limited amount of the organic solvent, the addition of an additional amount of an organic solvent directly gives a diluted uniform solution of the epoxy resin having a low viscosity without the need for troublesome operations such as dissolving by heating. A further advantage of the present invention is that since the mixing of the organic solvent results in lowering the temperature of the solution to below a point at which the catalyst is active and also in lowering the resin concentration, the reaction is immediately stopped and the proceeding of unexpected reactions is thus inhibited. Furthermore, as a result of the lowering of the solids concentration, the viscosity of the final resin solution is kept at a low level easy for handling, and the withdrawal of the solution from the reactor is effected while the amount of the solution adhering to the reactor wall is markedly reduced. The yield of the final product is as high as 99%.

The organic solvent added in the latter stage may be the same as, or different from, the organic solvent used in the polyaddition reaction. Since the solvent added in the later stage is not used in the reaction, it may be a solvent having a lower boiling point than the aforesaid solvents. For example, butanol, methyl isobutyl ketone, toluene, etc. may be added in the later stage. In the present invention, the reaction and the preparation of the final solution can be performed smoothly by adding solvents before and after the polyaddition reaction. In addition, after the polyaddition, it is possible to use an organic solvent of any desired composition which imparts excellent coatability, film properties and film bakability to the lacquer. This is another marked advantage of this invention.

Another advantage of this invention is that the epoxy resin solution so obtained can be used directly in the production of a lacquer. Specifically, in this invention, the epoxy resin solution is mixed with a solution of a resin acting as a curing agent for the epoxy resin to form an epoxy-type lacquer. Mixing of the two resin solutions may be carried out in a vessel different from the reaction system. But according to this invention, the epoxy-type lacquer can be advantageously produced within the polyaddition reaction system. This advantage is not at all seen in the prior art.

The resin acting as a curing agent for the epoxy resin is a resin having a functional group such as a phenolic hydroxyl group, a methylol group, or a carboxyl group. Specific examples include resol or novolak type phenol/formaldehyde resins, xylene resins, melamine resins, urea resins, benzoguanamine resins, alkyd resins, phthalic acid resins, acrylic resins and vinyl resins.

Preferably, these thermosetting or thermoplastic resins contain a functional group capable of reacting with the epoxy group, such as a phenolic hydroxyl group, a methylol group or a carboxyl group, in a concentration of 50 to 1500 millimols per 100 g of the resin, and should be soluble in the aforesaid organic solvents.

In the present invention, the epoxy resin and the resin as a curing agent can be mixed in a weight ratio of from 97:3 to 10:90 as solids. The resulting lacquer, with its resin solids concentration being in the range of 15 to 50% by weight, can be used in various applications, particularly for coating metallic containers. The two resins may be used as a lacquer in the form of a simply mixed composition. If desired, the mixed resin composition can be used as a lacquer after adding a catalyst and performing a preliminary reaction.

The epoxy-type lacquer of this invention brings about very remarkable advantages when used in coating metallic containers. Since this lacquer has a relatively low content of an epoxy resin component having a low molecular weight, it has excellent extraction resistance, i.e. excellent hygienic property, even when it is coated on the inner surfaces of containers and various foods are filled in the containers. At the same time, it imparts excellent corrosion resistance to metallic containers. In addition, because the epoxy resin component of the lacquer has a uniform molecular weight distribution and does not contain a crosslinked gel-like component, the lacquer imparts very good corrosion resistance, and has excellent processability as a coated film. For example, even at a seamed portion which undergoes severe workings such as flanging and double seaming, the occurrence of film imperfections such as cracking or peeling can be effectively prevented.

The following examples illustrate the present invention more specifically.

The properties of the epoxy resins were measured by the following methods.

VISCOSITY

The epoxy resin was formed into a 40% by weight butyl Cellosolve solution, and its viscosity was measured at 25° C. by a B-type viscometer.

EPOXY EQUIVALENT

A sample containing 0.6 to 0.9 mg equivalent of epoxy groups was precisely weighed in a 100 ml Erlenmeyer flask, and 10 ml of chloroform was added to form a solution. Ten milliliters of a tetraethyl ammonium bromide solution and 2 or 3 drops of a crystal violet indicator were added to the solution, and the solution was titrated with a 0.1 N perchloric acid acetic acid solution. By the same method, a blank test was carried out. The epoxy equivalent was calculated in accordance with the following equation.

$$[\text{Epoxy equivalent}] \, (\text{g/eq}) = \frac{100 \times W}{(V - B) \times N \times F}$$

W: the weight (g) of the sample,
V: the amount (ml) of titration of 0.1 N perchloric acid acetic acid solution,
B: the amount (ml) of titration of the 0.1 N perchloric acid acetic acid solution in the blank test,
N: the normality (eq/liter) of the 0.1 N perchloric acid acetic acid solution,
F: the factor of the 0.1 N perchloric acid acetic acid solution.

NUMBER AVERAGE MOLECULAR WEIGHT

Ethylene dichloride solutions of an epoxy resin having a concentration of 2, 4, 6, 8 and 10% by weight were prepared, and the rise $\Delta T$ in boiling point was measured at each of these concentrations. The number average molecular weight $\overline{M}n$ of the sample is given by the following equation.

$$\overline{M}n = Kb \frac{1000 \times \omega_2}{\Delta T \times \omega_1}$$

where
Kb: the rise in mol boiling point (3.21 with ethylene dichloride)
$\omega_1$: the weight (g) of ethylene dichloride,
$\omega_2$: the weight (g) of the epoxy resin $\overline{M}n$ values were determined in accordance with the above equation on the ethylene dichloride solutions having the above concentrations. The $\overline{M}n$ values and $\omega_2/\omega_1$ were plotted in a graph, and the $M_n$ obtained when $\omega_2/\omega_1$ was extrapolated to 0 is defined as the number average molecular weight.

RELATIVE LOW-MOLECULAR-WEIGHT COMPONENT CONTENT

The ratio of the low-molecular-weight component determined by using the chart obtained by the GPC (Gel Permeation Chromatography) method. The ratio of the fraction of a low-molecular-weight component having a $\overline{M}n$ of not more than 900 of each resin relative to the fraction of the low-molecular-weight component in Comparative Example 1 (Table 1) or the fraction of the low-molecular-weight component in Comparative Example 5 (Table 2) which is taken as 100% is defined as the relative low-molecular-weight component content. Namely, (Relative low-molecular-weight component content) (%) =

$$\frac{\text{(Fraction of the low-molecular-weight component of each resin)}}{\text{(Fraction of the low-molecular-weight component in Comparative Example 1 or 5)}} \times 100$$

RELATIVE INSOLUBLE CONTENT

A solution composed of 4 g of an epoxy resin, 31 g of butyl Cellosolve and 5 g of n-octane was centrifuged at 6000 rpm for 2 hours. The precipitate was evaporated to dryness, and the weight fraction of the precipitate was measured. The ratio of the weight fraction of the precipitate of each resin relative to that in Comparative Example 1 (Table 1) or that in Example 5 (Table 2) which is taken as 100% is defined as the relative insoluble content. Namely, (Relative insoluble content) (%) =

$$\frac{\text{(Fraction of the precipitate of each resin)}}{\text{(Fraction of the precipitate in Comparative Example 1 or 5)}} \times 100$$

PRODUCTION OF A LOW-MOLECULAR-WEIGHT EPOXY RESIN

Epichlorohydrin (18,500 g) and bisphenol A (4,560 g) were charged into a 65-liter reactor equipped with a stirrer, a thermometer, a dropping funnel and a device for condensing and separating an azeotropic mixture of epichlorohydrin and water and recycling the lower epichlorohydrin layer to the reactor. With stirring, this solution was heated under reflux at 119° C., and 6,080 g of a 40% aqueous solution of sodium hydroxide was added dropwise over 3.5 hours. The rate of addition of the aqueous sodium hydroxide solution and the heating of the reactor were adjusted so that the temperature of the reaction mixture reached 99° to 119° C. After the addition of the aqueous sodium hydroxide solution, the mixture was further heated for 15 minutes to remove water completely. Then, the unreacted epichlorohydrin was removed by distillation. To make sodium chloride easily separable from the crude product, 1,100 g of toluene was added to dissolve the crude product. Sodium chloride was removed by filtration, and the residue was distilled under reduced pressure to remove toluene completely.

The resulting low-molecular-weight resin had a softening point (determined by the Duran method) of 193, and a molecular weight of 380. The amount of the resin yielded was 7,600 g. The above procedure was repeated to obtain a low-molecular-weight epoxy resin.

EXAMPLE 1

A 65-liter reactor equipped with a stirring device, a thermometer, a condenser and a nitrogen gas supply device was charged with 7,600 g of the low-molecular-weight epoxy resin obtained by the method described above, 4,200 g of bisphenol A, 0.3 g of sodium hydroxide and 630 g of butyl Cellosolve (Sp; 8.9, B.P. 172° C.). The contents were stirred, and while passing nitrogen gas, heated to 175° C. over 1 hour, and then reacted at 175° C. for 2.5 hours. (The resin solids concentration was 95%). After the reaction, a mixed solvent composed of 13,370 g of butyl Cellosolve and 14,000 g of xylene was added with stirring to prepare a 30% epoxy resin solution. The temperature of the resin solution at this time was 90° C.

This epoxy resin had an epoxy equivalent of 3,320 g/eq, a viscosity of 3,550 centistokes and a number average molecular weight of 3,640.

Separately, a 37% aqueous formaldehyde solution (1.4 mols) was added to 1 mol of mixed phenol composed of 75% by weight of bisphenol A, 15% by weight of p-cresol and 10% by weight of m-cresol. The temperature of the solution was raised to 65° C. to dissolve the mixed phenol. The solution was reacted at 95° C. after adding a basic catalyst. The reaction product was extracted with a mixed solvent composed of 50% by weight of methyl isobutyl ketone and 50% by weight of xylene, and washed with water. The water which settled was caused to flow out, and removed by the azeotropic method.

The resulting 30% solution of the resol-type phenolic resin and the aforesaid 30% epoxy resin solution were mixed in a weight ratio of 20:80 to obtain an epoxyphenol-type lacquer of Example 1.

The can bodies described in Table 1 were produced in the following manner. The epoxyphenol-type lacquer mentioned above was roll-coated on one surface (that surface which was to be the outside surface of a can after can making) of an electrolytic chromate-treated steel sheet (TFS) having a thickness of 0.22 mm, a length of 827 mm and a width of 1026 mm so that the thickness of the coated film after baking would become 2 microns. The coated film was baked at 190° C. for 10 minutes. Subsequently, the other surface (that surface which was to become the inside surface of the can after can making) was roll-coated with the same lacquer so that the thickness of the coated film after baking would become 7 microns, and then the coated film was baked at 210° C. for 10 minutes. Furthermore, printing and a finishing varnish were margin-coated on that surface which was to become the outside surface of the can to produce a coated sheet.

The large sheet was cut into a strip having a length of 827 mm and a width of 170.40 mm by an ordinary cutting machine. Both end edge portions of the strip were heated to about 270° C. by high-frequency heating. A tape of a polyamide-type adhesive having a thickness of 50 microns and a width of 5 mm was applied to one end edge portion of the inner side of the strip to be bonded. The same adhesive tape as above having a thickness of 50 microns and a width of 8 mm was applied to the other end edge portion so that it was folded over to the outside surface by 5 mm and to the inside surface by about 2.5 mm thereby protecting the cut end surface. The strip was then roll-pressed for 35 milliseconds, cooled, and then cut into a size of 136.53 mm×170.40 mm to form a can-making blank.

It was then fabricated into a cylindrical shape having a height of 136.53 mm by an ordinary can maker. The two end edge portions to which the adhesive was applied were heated to 250° C. by high-frequency heating. The edge portions were compressed for 30 milliseconds so that the adhesive tapes overlaped each other, and then cooled to produce a can body.

Then, the can body was flanged by an ordinary method, and a can end produced by an ordinary method was applied to the can body by double seaming. By the above procedure, the empty bonded cans of Example 1 shown in Table 1 were produced.

Aqueous solutions containing 1% citric acid, 1% sodium chloride and 0.001% surface-active agent, respectively, were filled into the empty cans, followed by double seaming. Ten such filled cans were heat-treated at 125° C. for 1 hour by ordinary retorting. Then, the double seamed portions between the can body and the can were carefully disassembled, and the corroded condition of the body hook radius portion (BHR portion . . . seamed portion of the can body) was observed. The ratio of corrosion of the seamed portion was calculated in accordance with the following equation.

$$\text{Ratio of corrosion (\%)} = \frac{\text{[Area of corrosion of the BHR portion]}}{\text{[Total area of the BHR portion]}} \times 100$$

Coca-cola was filled in 300 empty cans obtained by the above method, and then the cans were double-seamed. The weights of the cans were individually measured, and they were stored at 37° C. for one year. Then, the weights of the cans were measured, and leaked cans were examined. Furthermore, the seamed portions were observed.

Consomme soup was filled in 300 empty cans obtained by the above method, and then the cans were double-seamed. The cans were then retorted at 118° C. for 1 hour in a customary manner, and stored at 37° C. for 1 year. Then, the occurrence of bulged cans was examined, and the seamed portions were observed.

EXAMPLE 2

The same reactor as used in Example 1 was charged with 7,800 g of the low-molecular-weight epoxy resin obtained by the method described hereinabove, 4,200 g of bisphenol A, 0.3 g of sodium hydroxide and 1,330 g of butyl Cellosolve. The contents were stirred, and while passing nitrogen gas, heated to 175° C. over 1 hour, and then reacted at 175° C. for 2.7 hours. (The resin solids concentration was 90%).

After the reaction, a mixed solvent composed of 12,670 g of butyl Cellosolve and 14,000 g of xylene was added with stirring to form a 30% epoxy resin solution having a temperature of about 90° C. This epoxy resin had an epoxy equivalent of 3,300 g/eq, a viscosity of 3,850 centistokes and a number average molecular weight of 3,680.

Thereafter, by the same method as in Example 1, a lacquer was prepared, cans were produced, contents were filled, and the coated lacquers were evaluated.

EXAMPLE 3

The same reactor as used in Example 1 was charged with 7,800 g of the low-molecular-weight epoxy resin obtained by the above method, 4,200 g of bisphenol A, 0.3 g of sodium hydroxide and 2,120 g of butyl Cellosolve. The contents were stirred, and while passing nitrogen gas, they were heated to 175° C. over 1 hour, and then reacted at 175° C. for 3.0 hours. (The resin solids concentration was 85%).

After the reaction, a mixed solvent composed of 11,880 g of butyl Cellosolve and 14,000 g of xylene was added with stirring to prepare a 30% epoxy resin solution having a temperature of about 100° C. This epoxy resin had an epoxy equivalent of 3,310 g/eq, a viscosity of 3,630 centistokes and a number average molecular weight of 3,620.

By the same method as in Example 1, a lacquer was produced and cans were made. Contents were filled in the cans, and the coated lacquers were evaluated in the same way as in Example 1.

EXAMPLE 4

The same reactor as used in Example 1 was charged with 7,800 g of the low-molecular-weight epoxy resin obtained by the aforesaid method, 4,200 g of bisphenol A, 0.3 g of sodium hydroxide and 4,000 g of butyl Cellosolve. The contents were stirred, and while passing nitrogen gas, heated to 175° C. over 1 hour and then reacted at 175° C. for 4.9 hours. (The resin solids concentration was 75%.)

After the reaction, a mixed solvent composed of 10,000 g of butyl Cellosolve and 14,000 g of xylene was added with stirring to prepare a 30% epoxy resin solution having a temperature of about 100° C. This epoxy resin had an epoxy equivalent of 3,300 g/eq, a viscosity of 3,640 centistokes and a number average molecular weight of 3,590.

Thereafter, by the same method as in Example 1, a lacquer was prepared, cans were produced, contents were filled, and the coated lacquers were evaluated.

EXAMPLE 5

The same reactor as used in Example 1 was charged with 7,800 g of the low-molecular-weight epoxy resin obtained by the aforesaid method, 4,200 g of bisphenol A, 0.3 g of sodium hydroxide and 5,140 g of butyl Cellosolve. The contents were stirred, and while passing nitrogen gas, heated to 175° C. over 1 hour and then reacted at 175° C. for 12.3 hours. (The resin solids concentration was 70%).

After the reaction, a mixed solvent composed of 8,860 g of butyl Cellosolve and 14,000 g of xylene was added to prepare a 30% epoxy resin solution having a temperature of about 100° C. This epoxy resin had an epoxy equivalent of 3,280 g/eq, a viscosity of 3,390 centistokes and a number average molecular weight of 3,610.

Thereafter, by the same method as in Example 1, a lacquer was prepared, cans were produced, contents were filled, and the coated lacquers were evaluated.

COMPARATIVE EXAMPLE 1

The same reactor as used in Example 1 was charged with 11,050 g of the low-molecule-weight epoxy resin obtained by the above method, 5,950 g of bisphenol A and 0.4 g of sodium hydroxide. The contents were stirred, and while passing nitrogen gas, heated to 175° C. over 1 hour, and then reacted at 175° C. for 2 hours. (The resin solids concentration was 100%.)

After the reaction, the molten resin was immediately taken out, solidified by cooling, and pulverized. The resulting epoxy resin had an epoxy equivalent of 3,360 g/eq., a viscosity of 3,480 centistokes, and a number average molecular weight of 3,750. The amount of the epoxy resin yielded was 13,580 g and the yield was 79.9%.

A 30-liter reactor equipped with a stirrer and a thermometer was charged with 6,000 g of the epoxy resin obtained by the above method, 7,000 g of butyl Cellosolve and 7,000 g of xylene, and the epoxy resin was dissolved at 70° to 80° C. over 6 hours to prepare a 30% epoxy resin solution.

Thereafter, by the same method as in Example 1, a lacquer was prepared, cans were produced, contents were filled, and the coated lacquers were evaluated.

COMPARATIVE EXAMPLE 2

The same reactor as used in Example 1 was charged with 7,800 g of the low-molecular-weight epoxy resin obtained by the above method, 4,200 g of bisphenol A, 0.3 g of sodium hydroxide and 370 g of butyl Cellosolve. The contents were stirred, and while passing nitrogen gas, heated to 175° C. for 2.3 hours. (The resin solids concentration was 97%.)

After the reaction, a mixed solvent of 13,630 g of butyl Cellosolve and 14,000 g of xylene was added with stirring to prepare a 30% epoxy resin solution having a temperature of about 80° C. This epoxy resin had an epoxy equivalent of 3,350 g/eq, a viscosity of 3,500 centistokes and a number average molecular weight of 3,700.

Thereafter, by the same method as in Example 1, a lacquer was prepared, cans were produced, contents were filled, and the coated lacquers were evaluated.

COMPARATIVE EXAMPLE 3

The same reactor as used in Example 1 was charged with 7,800 g of the low-molecular-weight epoxy resin obtained by the above method, 4,200 g of bisphenol A, 0.3 g of sodium hydroxide and 6,460 g of butyl Cellosolve. The contents were stirred, and while passing nitrogen gas, heated to 175° C. over 1 hour, and then reacted at 175° C. for 25.8 hours. (The resin solids concentration was 65%.)

After the reaction, a mixed solvent composed of 7,540 g of butyl Cellosolve and 14,000 g of xylene was added with stirring to prepare a 30% epoxy resin solution having a temperature of about 110° C. This epoxy resin had an epoxy equivalent of 3,100 g/eq., a viscosity of 2,300 centistokes and a number average molecular weight of 3,320.

Thereafter, by the same method as in Example 1, a lacquer was prepared, cans were produced, contents were filled, and the coated lacquers were evaluated.

COMPARATIVE EXAMPLE 4

The same reactor as used in Example 1 was charged with 7,800 g of the low-molecular-weight epoxy resin obtained by the above method, 4,200 g of bisphenol A, 0.3 g of sodium hydroxide and 12,000 g of butyl Cellosolve. The contents were stirred, and while passing nitrogen gas, heated to 175° C. over 1 hour and then reacted at 175° C. for 35.0 hours. (The resin solids concentration was 50%.)

After the reaction, a mixed solvent composed of 2,000 g of butyl Cellosolve and 14,000 g of xylene was added to prepare a 30% epoxy resin solution having a temperature of about 115° C. This epoxy resin had an epoxy equivalent of 3,050 g/eq, a viscosity of 1,820 centistokes and a number average molecular weight of 2,980.

Thereafter, by the same method as in Example 1, a lacquer was prepared, cans were produced, contents were filled, and the coated lacquers were evaluated.

The results obtained in Examples 1 to 5 and Comparative Examples 1 to 4 are summarized in Table 1.

TABLE 1

| Test | Synthesis Conditions | | Properties of Epoxy Resin | | | |
|---|---|---|---|---|---|---|
| | Resin Concentration (%) | Reaction time (hrs) | Epoxy equivalent (g/eq) | Viscosity (centistokes) | Relative low-molecular-weight content (wt %) | Relative insoluble content (wt %) |
| Example 1 | 95 | 2.5 | 3,320 | 3,550 | 43 | 32 |
| Example 2 | 90 | 2.7 | 3,300 | 3,580 | 37 | 25 |
| Example 3 | 85 | 3.0 | 3,310 | 3,630 | 33 | 23 |
| Example 4 | 75 | 4.9 | 3,300 | 3,640 | 38 | 17 |
| Example 5 | 70 | 12.3 | 3,280 | 3,390 | 53 | 10 |
| Comparative | 100 | 2.0 | 3,360 | 3,480 | 100 | 100 |

TABLE 1-continued

| Test | | | | | | |
|---|---|---|---|---|---|---|
| Example 1 | | | | | | |
| Comparative Example 2 | 97 | 2.3 | 3,350 | 3,500 | 93 | 87 |
| Comparative Example 3 | 65 | 25.8 | 3,100 | 2,300 | 85 | 7 |
| Comparative Example 4 | 50 | 35.0 | 3,050 | 1,820 | 94 | 4 |

| | Ratio of corrosion of the seamed portion by model solutions after retorting (%) | Filled Can Storage Test (37° C., one year) | | | |
|---|---|---|---|---|---|
| | | Coca Cola | | Consomme soup | |
| | | Number of leaked cans | State of the seamed portion | Number of bulged cans | State of the seamed portion |
| Example 1 | 7 | 0/300 | no change | 0/300 | no change |
| Example 2 | 3 | 0/300 | no change | 0/300 | no change |
| Example 3 | 4 | 0/300 | no change | 0/300 | no change |
| Example 4 | 5 | 0/300 | no change | 0/300 | no change |
| Example 5 | 7 | 0/300 | no change | 0/300 | no change |
| Comparative Example 1 | 98 | 25/300 | Heavy corrosion at the entire circumference | 21/300 | Heavy corrosion at the entire circumference |
| Comparative Example 2 | 93 | 21/300 | Heavy corrosion at the entire circumference | 20/300 | Heavy corrosion at the entire circumference |
| Comparative Example 3 | 75 | 6/300 | pitting corrosion | 4/300 | pitting corrosion |
| Comparative Example 4 | 87 | 18/300 | Heavy corrosion at the entire circumference | 15/300 | Heavy corrosion at the entire circumference |

EXAMPLE 6

The same reactor as in Example 1 was charged with 7,750 g of the low-molecular-weight epoxy resin obtained by the above method, 4,250 g of bisphenol A, 0.3 g of sodium hydroxide and 630 g of butyl Cellosolve. The contents were stirred, and while passing nitrogen gas, heated to 175° C. over 1 hour and then reacted at 175° C. for 2.5 hours. (The resin solids concentration was 95%).

After the reaction, a mixed solvent of 11,880 g of butyl Cellosolve and 14,000 g of xylene was added with stirring to prepare a 30% epoxy resin solution having a temperature of about 90° C. This epoxy resin had an epoxy equivalent of 4,010 g/eq, a viscosity of 3,880 centistokes and a number average molecular weight of 4,230.

Separately, 1 mol of urea and a 40% butanol solution of 2.5 mols of formaldehyde were mixed, and after adding 0.01 mol (as 10% aqueous solution) of sodium carbonate, reacted at 95° C. for 1 hour. Phosphoric acid (0.005 mol) was added, and the reaction was further carried out for 1 hour. The reaction mixture was washed with hot water at 80° C. eight times, and water was removed by azeotropic dehydration to form a urea resin.

The urea resin was then dissolved by a mixed solvent composed of 50% by weight of xylene and 50% by weight of butanol to prepare a 30% urea resin solution.

Then, the 30% epoxy resin solution above and the 30% urea resin solution above were mixed at a weight ratio of 80:20 to prepare an epoxy urea-type lacquer of Example 6.

The punched-drawn cans described in Table 2 were produced in the following manner. The aforesaid epoxy urea-type lacquer was roll-coated on one surface (that surface which was to be the inside surface of a can after punching) of an electrolytic chromate-treated steel sheet (TFS) having a thickness of 0.17 mm, a length of 827 mm and a width of 1026 mm so that the thickness of the coated film after baking would become 7 microns. The coated film was then baked at 210° C. for 10 mintutes. Printing and a finishng varnish were applied to the other surface of the sheet (that surface which was to be the outside surface of the can after punching) to produce a coated sheet.

The coated sheet was then punched to a diameter of 112 mm and drawn (the draw ratio in the first stage 1.7; the draw ratio in the second stage 2.1) to obtain a can having an inside diameter of 53 mm and a height of 40 mm with no seem on the side surface.

Aqueous solutions containing 1% citric acid, 1% sodium chloride and 0.001% surface-active agent respectively were filled into such empty cans, followed by double seaming. Ten such cans were retorted at 125° C. for 1 hour in a customary manner. Then, the double-seamed portion between the can body and the can end was carefully disassembled, and the corroded state of the BHR portion was observed and evaluated by the same method as in Examples 1 to 5 and Comparative Examples 1 to 4.

Seasoned bonito and tuna dressing were each filled in 300 empty cans, followed by double seaming. The filled cans were retorted at 118° C. for 1 hour in a customary manner, and then stored at 37° C. for one year. After the one-year storage test, the occurrence of bulged cans was examined, and the double-seamed portions were observed.

EXAMPLE 7

The same reactor as used in Example 1 was charged with 7,750 g of the low-molecular-weight epoxy resin obtained by the above method, 4,250 g of bisphenol A, 0.3 g of sodium hydroxide and 1,330 g of butyl Cellosolve. The contents were stirred, and while passing nitrogen gas, heated to 175° C. over 1 hour and then reacted at 175° C. for 2.7 hours. (The resin solids concentration was 90%.)

After the reaction, a mixed solvent composed of 12,670 g of butyl Cellosolve and 14,000 g of xylene was added with stirring to prepare a 30% epoxy resin solution having a temperature of about 90° C. This epoxy resin had an epoxy equivalent of 4,080 g/eq, a viscosity of 3,890 centistokes and a number average molecular weight of 4,190.

Thereafter, by the same method as in Example 6, a lacquer was prepared, cans were produced, contents were filled and the coated lacquers were evaluated.

EXAMPLE 8

The same reactor as used in Example 1 was charged with 7,750 g of the low-molecular-weight epoxy resin obtained by the aforesaid method, 4,250 g of bisphenol A, 0.3 g of sodium hydroxide and 2,120 g of butyl Cellosolve. The contents were stirred, and while passing nitrogen gas, heated to 175° C. over 1 hour and then reacted at 175° C. for 3.0 hours. (The resin solids concentration was 85%.)

After the reaction, a mixed solvent composed of 11,880 g of butyl Cellosolve and 14,000 g of xylene was added with stirring to prepare a 30% epoxy resin solution having a temperature of about 100° C. This epoxy resin had an epoxy equivalent of 3,820 g/eq, a viscosity of 4,010 centistokes and a number average molecular weight of 4,220.

Thereafter, by the same method as in Example 6, a lacquer was prepared, cans were produced, contents were filled, and the coated lacquers were evaluated.

EXAMPLE 9

The same reactor as used in Example 1 was charged with 7,750 g of the low-molecular-weight epoxy resin, 4,250 g of bisphenol A, 0.3 g of sodium hydroxide and 4,000 g of butyl Cellosolve. The contents were stirred, and while passing nitrogen gas, heated to 175° C. over 1 hour and then reacted at 175° C. for 48 hours. (The resin solids concentration was 75%.)

After the reaction, a mixed solvent composed of 10,000 g of butyl Cellosolve and 14,000 g of xylene was added with stirring to prepare a 30% epoxy resin solution having a temperature of about 100° C. This epoxy resin had an epoxy equivalent of 3,990 g/eq, a viscosity of 3,820 centistokes and a number average molecular weight of 4,250.

Thereafter, by the same method as in Example 6, a lacquer was prepared, cans were produced, contents were filled, and the coated lacquers were evaluated.

EXAMPLE 10

The same reactor as used in Example 1 was charged with 7,750 g of the low-molecular-weight epoxy resin obtained by the above method, 4,250 g of bisphenol A, 0.3 g of sodium hydroxide and 5,140 g of butyl Cellosolve. The contents were stirred, and while passing nitrogen gas, were heated to 175° C. over 1 hour and then reacted at 175° C. for 12.0 hours. (The resin solids concentration was 70%.)

After the reaction, a mixed solvent composed of 8,860 g of butyl Cellosolve, and 14,000 g of xylene was added with stirring to prepare a 30% epoxy resin solution having a temperature of about 100° C. This epoxy resin had an epoxy equivalent of 4,010 g/eq, a viscosity of 3,790 centistokes and a number average molecular weight of 4,150.

Thereafter, by the same method as in Example 6, a lacquer was prepared, cans were produced, and the coated lacquers were evaluated.

COMPARATIVE EXAMPLE 5

The same reactor as in Example 1 was charged with 10,980 g of the low-molecular-weight epoxy resin obtained by the above method, 6.020 g of bisphenol A and 0.4 g of sodium hydroxide. The contents were stirred, and while passing nitrogen gas, heated to 175° C. over 1 hour and then reacted at 175° C. for 2.0 hours. (The resin solids concentration was 100%.) After the reaction, the molten resin was immediately taken out, solidified by cooling, and pulverized.

The resulting epoxy resin had an epoxy equivalent of 4,100 g/eq, a viscosity of 4,020 centistokes and a number average molecular weight of 4,310. The amount of the epoxy resin yielded was 12,970 g, and the yield was 76.3%. A 30% epoxy resin solution was prepared by using the resulting epoxy resin in the same way as in Comparative Example 1.

Thereafter, by the same method as in Example 6, a lacquer was prepared, cans were produced, contents were filled, and the coated lacquers were evaluated.

COMPARATIVE EXAMPLE 6

The same reactor was used in Example 1 was charged with 7,750 g of the low-molecular-weight epoxy resin obtained by the above method, 4,200 g of bisphenol A, 0.3 g of sodium hydroxide and 370 g of butyl Cellosolve. The contents were stirred, and while passing nitrogen gas, heated to 175° C. over 1 hour and then reacted at 175° C. for 2.3 hours. (The resin solids concentration was 97%.)

After the reaction, a mixed solvent composed of 13,630 g of butyl Cellosolve and 14,000 g of xylene was added with stirring to prepare a 30% epoxy resin solution having a temperature of about 90° C. This epoxy resin had an epoxy equivalent of 4,070 g/eq, a viscosity of 3,900 centistokes and a number average molecular weight of 4,290.

Thereafter, by the same method as in Example 6, a lacquer was prepared, cans were produced, contents were filled, and the coated lacquers were evaluated.

COMPARATIVE EXAMPLE 7

The same reactor as used in Example 1 was charged with 7,750 g of the low-molecular-weight epoxy resin obtained by the above method, 4,200 g of bisphenol A, 0.3 g of sodium hydroxide and 6,460 g of butyl Cellosolve. The contents were stirred, and while passing nitrogen gas, heated to 175° C. over 1 hour and reacted at 175° C. for 28.2 hours. (The resin solids concentration was 65%.)

After the reaction, a mixed solvent composed of 7,540 g of butyl Cellosolve and 14,000 g of xylene was added with stirring to prepare a 30% epoxy resin solution having a temperature of about 10° C. This epoxy resin had an epoxy equivalent of 3,920 g/eq, a viscosity of 2,700 centistokes and a number average molecular weight of 3,610.

Thereafter, by the same, method as in Example 6, a lacquer was prepared, cans were produced, contents were filled and the coated lacquers were evaluated.

COMPARATIVE EXAMPLE 8

The same reactor as used in Example 1 was charged with 7,750 g of the low-molecular-weight epoxy resin obtained by the above method, 4,200 g of bisphenol A, 0.3 g of sodium hydroxide and 1,200 g of butyl Cellosolve. The contents were stirred, and while passing nitrogen gas, heated to 175° C. over 1 hour, and then reacted at 175° C. for 37.0 hours. (The resin solids concentration was 50%.)

After the reaction, a mixed solvent composed of 2,000 g of butyl Celosolve and 14,000 g of xylene was added with stirring to prepare a 30% epoxy resin solution having a temperature of about 115° C. This epoxy resin had an epoxy equivalent of 4,020 g/eq, a viscosity of 1,990 centistokes and a number average molecular weight of 3,040.

Thereafter, by the same method as in Example 6, a lacquer was prepared, cans were produced, contents were filled, and the coated lacquers were evaluated.

The results of Examples 6 to 10 and Comparative Examples 5 to 8 are summarized in Table 2.

than that at which said catalyst is active, and mixing the resulting diluted solution with a solution of a resin having a functional reactive group acting as a curing agent for the epoxy resin.

2. The process of claim 1 wherein the liquid epoxy resin in reacted with the bisphenol A in the inert organic solvent in the presence of the catalyst under such conditions that the resin solids concentration of the resulting solution becomes 70 to to 95% by weight, thereby to prepare the concentrated solution of the epoxy resin having a number average molecular weight of 2,000 to 10,000, and the organic solvent is added to the concentrated solution so that the resin solids concentration of the diluted solution becomes 15 to 60% by weight and the temperature of the diluted solution becomes lower than that at which the catalyst is active.

3. The process of claim 1 wherein the inert organic solvent used in the reaction has a solubility parameter

TABLE 2

| Test | Synthesis Conditions | | Properties of Epoxy Resin | | | |
|---|---|---|---|---|---|---|
| | Resin Concentration (%) | Reaction time (hrs) | Epoxy equivalent (g/eq) | Viscosity (centistokes) | Relative low-molecular-weight content (wt %) | Relative insoluble content (wt %) |
| Example 6 | 95 | 2.5 | 4,010 | 3,880 | 33 | 47 |
| Example 7 | 90 | 2.7 | 4,080 | 3,890 | 27 | 31 |
| Example 8 | 85 | 3.0 | 4,030 | 4,010 | 24 | 28 |
| Example 9 | 75 | 4.8 | 3,990 | 3,820 | 29 | 23 |
| Example 10 | 70 | 12.0 | 4,010 | 3,790 | 41 | 14 |
| Comparative Example 5 | 100 | 2.0 | 4,100 | 4,020 | 100 | 100 |
| Comparative Example 6 | 97 | 2.3 | 4,070 | 3,900 | 90 | 91 |
| Comparative Example 7 | 65 | 28.2 | 3,920 | 2,700 | 74 | 9 |
| Comparative Example 8 | 50 | 37.0 | 4,020 | 1,990 | 92 | 3 |

| | Ratio of corrosion of the seamed portion by model solutions after retorting (%) | Filled Can Storage Test (37° C., one year) | | | |
|---|---|---|---|---|---|
| | | Seasoned bonito | | Tuna dressing | |
| | | Number of leaked cans | State of the seamed portion | Number of bulged cans | State of the seamed portion |
| Example 6 | 7 | 0/300 | no change | 0/300 | no change |
| Example 7 | 2 | 0/300 | no change | 0/300 | no change |
| Example 8 | 2 | 0/300 | no change | 0/300 | no change |
| Example 9 | 3 | 0/300 | no change | 0/300 | no change |
| Example 10 | 6 | 0/300 | no change | 0/300 | no change |
| Comparative Example 5 | 95 | 31/300 | Heavy corrosion at the entire circumference | 29/300 | Heavy corrosion at the entire circumference |
| Comparative Example 6 | 92 | 29/300 | Heavy corrosion at the entire circumference | 25/300 | Heavy corrosion at the entire circumference |
| Comparative Example 7 | 63 | 7/300 | Pitting corrosion | 6/300 | Pitting corrosion |
| Comparative Example 8 | 82 | 25/300 | Heavy corrosion at the entire circumference | 21/300 | Heavy corrosion at the entire circumference |

What is claimed is:

1. A process for producing an epoxy lacquer, which comprises reacting a liquid epoxy resin having about one bisphenol A skeleton on an average in the molecular chain and derived from bisphenol A and an epihalohydrin, with bisphenol A in the presence of a catalyst in an inert organic solvent to prepare a concentrated solution of an epoxy resin having a number average molecular weight of from 2,000 to 10,000, stopping the reaction by adding an organic solvent to the concentrated solution to dilute it and maintain it at a temperature lower ($S_p$) of 8.0 to 12.0 and a boiling point of at least 130° C.

4. The process of claim 1 wherein the liquid epoxy resin is reacted with the bisphenol A in a mole ratio of from 1:0.75 to 1:0.95 in the inert organic solvent having a solubility parameter ($S_p$) of 8.0 to 12.0 and a boiling point of at least 130° C. in the presence of the catalyst under such conditions that the resin solids concentration of the resulting solution becomes 70 to 95% by weight, thereby to prepare the concentrated solution of the epoxy resin having a number average molecular weight of 2,000 to 10,000 and an epoxy equivalent in the range of 1,000 to 8,000, and the organic solvent is added to the concentrated solution so that the resin solids concentration of the diluted solution becomes 20 to 55% by weight and the temperature of the diluted solution becomes lower than that at which the catalyst is active.

5. The process of claim 1 wherein the organic solvent added to the concentrated solution comprises the same solvent as the inert organic solvent.

6. The process of claim 1 wherein the organic solvent added to the concentrated solution comprises a solvent other than the inert organic solvent.

7. The process of claim 1 wherein the functional reactive group of the resin acting as a curing agent for the epoxy resin is selected from the group consisting of phenolic hydroxyl group, methylol group and carboxyl group.

8. The process of claim 7 wherein the resin acting as a curing agent is selected from the group consisting of resol resins, novalak resins, xylene resins, melamine resins, urea resins, benzoguanamine resins, alkyd resins, phthalic acid resins, acrylic resins and vinyl resins, said resin containing said functional group in a concentration of 50 to 1500 millimoles per 100 grams of resin.

9. The process of claim 8 wherein the epoxy resin and the resin acting as a curing agent are mixed in a weight ratio of 97.3 to 10:90, as solids.

* * * * *

UNITED STATES PATENT AND TRADEMARK OFFICE
CERTIFICATE OF CORRECTION

PATENT NO. : 4,525,497
DATED : June 25, 1985
INVENTOR(S) : Seishichi Kobayashi, et al.

It is certified that error appears in the above-identified patent and that said Letters Patent is hereby corrected as shown below:

Claim 9, line 3, delete "97.3", insert --97:3--.

Claim 2, line 2, after "resin", delete "in", insert --is--;
          line 5, delete the second occurrence of "to".

Signed and Sealed this

Fifteenth Day of October 1985

[SEAL]

Attest:

Attesting Officer

DONALD J. QUIGG

Commissioner of Patents and
Trademarks—Designate